UNITED STATES PATENT OFFICE.

ERIK LUDVIG RINMAN, OF HARNÄS, SWEDEN.

PROCESS OF MAKING SODIUM BICARBONATE AND ORGANIC SUBSTANCES FROM SODA-PULP-WASTE LIQUOR.

1,045,889.  Specification of Letters Patent.  Patented Dec. 3, 1912.

No Drawing.   Application filed January 27, 1911.  Serial No. 605,094.

*To all whom it may concern:*

Be it known that I, ERIK LUDVIG RINMAN, a subject of the King of Sweden, residing at Harnäs, in the Kingdom of Sweden, have invented new and useful Improvements in Processes of Making Sodium Bicarbonate and Organic Substances from Soda-Pulp-Waste Liquor, of which the following is a specification.

When the so-called black liquors from soda pulp mills have been freed, by treating the same with carbonic acid or otherwise, from those organic substances which are precipitated by carbonic acid, they contain sodium oxid combined with carbonic acid or weaker acids, and also combined with acetic acid, formic acid, resinous acids and other organic acids.

The object of my invention is to treat the said black liquors further in such a manner as to recover directly the largest possible quantity of sodium in the form of bicarbonate of soda (soda lye for boiling cellulose substances) and, if desired, at the same time obtain the acetic acid, the formic acid, the resinous acids and other organic acids in a practically suitable form.

The invention consists, chiefly, in directly subjecting the black liquor, freed in any suitable manner, wholly or to a considerable part, from those organic substances which are precipitated by carbonic acid, and, if desired, in a concentrated form, to the well known ammonia-soda process. By this means I obtain bicarbonate of soda and, if lime be used for driving off ammonia from the waste liquor, I also obtain calcium salts of acetic, formic, resinous and other organic acids. In fact, by treating the black liquor with ammonia and carbonic acid at a suitable temperature and a suitable concentration of sodium salts dissolved therein, bicarbonate of soda will be precipitated even more fully than when a mere solution of sodium chlorid is treated, due to the fact that a larger quantity of ammonium salts may be dissolved when several acids with more easily soluble ammonium salts are present than when the solution contains only ammonium chlorid.

In order that my invention may be fully understoood, I will now describe a particular example thereof, viz. the treatment of a black liquor containing sodium chlorid, said liquor having first been substantially freed by carbonic acid (bicarbonate of soda) from organic substances and reduced by evaporation to a suitable concentration. The black liquor thus treated contains $Na_2O$ combined with organic acids, hydrochloric acid and carbon dioxid, the concentration being preferably such that one liter of liquor contains about 100 grams of $Na_2O$ combined with organic acids, about 80 grams of $Na_2O$ combined with hydrochloric acid and about 30 grams of $Na_2O$ combined with carbon dioxid. This liquor is further treated in ordinary saturating apparatus with ammonia and carbon dioxid, at a temperature of 20° to 40° centigrade, until about 60 to 70 per cent. of the quantity of sodium oxid has been precipitated in the form of bicarbonate of soda, whereupon the precipitate is separated in suitable filtering apparatus from the dark-colored mother-liquor. For the saturation with carbon dioxid I preferably employ the escape gases from lime-burning furnaces (containing about 25 to 30 per cent. of carbon dioxid), in which case the saturation will generally require a time of 12 to 24 hours (more or less according to the concentration of the carbon dioxid).

The mother-liquor from the precipitate contains hydrochloric acid, acetic acid, formic acid, resinous acids and oxy-acids soluble in water, all combined with ammonia and sodium. From this mother-liquor not only ammonia but also the organic acids should be recovered. This is effected in the following manner: First free ammonia and ammonia combined with carbonic acid and, possibly, other weak acids, such as resinous acids, are driven off; in the latter case the said resinous acids are precipitated. Thereupon a strong base, such as lime, is added, in a quantity somewhat larger than that calculated from the formula. By this means the ammonia is disengaged, while the acids produce lime salts. Resinous substances previously precipitated may be removed, or not, before the lime is added. The ammonia is thereupon separated from the solution by heating same, during a sufficiently long time, in a suitable apparatus. As the liquid is very liable to skim, care should be taken to prevent this by any suitable means, such as agitators, addition of paraffin, or the like.

If the resinous acids have not been separated before, the lime added to the lye produces an easily filterable and washable finegrained precipitate of calcium resinates insoluble in water, whereas the acetic acid and the formic acid as well as the oxy-acids form soluble calcium salts. If the said lye is to be utilized this may be performed in the following way. The calcium resinate is separate from the solution by known methods of filtration or pressing. The calcium resinate thus obtained may be treated in any suitable manner, for instance by dry distillation, in the presence of steam or not. The solution obtained from the said processes (the filtrate) now contains calcium salts of acetic acid, formic acid, other organic acids and, possibly, hydrochloric acid and also contains sodium chlorid. If the organic acids in solution are to be utilized, the solution is concentrated as hereinafter set forth. Acetate and formate of lime together with sodium chlorid may be crystallized out from the solution concentrated to the consistency of syrup. The main quantity of the latter salt may be crystallized out without considerable quantities of organic salts being mixed therewith, and it may be used in the process instead of pure sodium chlorid, especially if the solution has first been freed, for instance by precipiration with oxy-acids the calcium salts of which are precipitable with alcohol. The lime salts thus separated may be utilized in any suitable way.

Another way of proceeding consists in evaporating the whole solution to dryness and, after adding a strong acid, distill off acetic acid and formic acid in well known manner. The residue of distillation may thereupon be subjected to dry distillation. It is obvious that the whole solution, reduced to dryness, may be immediately exposed to dry distillation, in the presence of superheated steam or not, in which case acetone and other substances are obtained. The acetate and the formate of lime separated may be treated in known manner for recovering acetic acid and formic acid. The other lime salts may be subjected to dry distillation, in the presence of steam or not, or they may be treated otherwise, if desired.

A further way of proceeding consists in disengaging the organic acids by stronger acids. Among the latter I preferably first employ sulfurous acid, by which about half the whole quantity of lime is precipitated as insoluble calcium sulfite; the reaction is best performed at an increased temperature, in order to prevent the formation of acid calcium sulfite. Hereby the acetic acid is disengaged and may be directly distilled off, if desired. When the acetic acid has been distilled off, the formic acid may be disengaged by a stronger acid, such as sulfuric acid, and distilled off.

A still further way of proceeding consists in first removing calcium sulfite and thereupon adding a sufficient quantity of sulfuric acid so that formic acid or all the organic acids are at once disengaged. Thereupon the mixture of acetic acid and formic acid is distilled off. Gypsum which is precipitated may be separated before or after the distillation. The oxy-acids may thereupon be directly separated from the mass of salts by filtration or pressing with or without the addition of water or other suitable solvent. The syrup thus obtained may be utilized by methods of dry distillation. If desired, the calcium salts of oxy-acids may be subjected to such a dry distillation before the formic acid is distilled off.

Obviously, care should be taken that in precipitating bicarbonate of soda the lye contains a sufficient quantity of sodium chlorid. It is obvious that in using the process for regenerating carbonate of soda from black liquors it should at the same time be directly used on new quantities of sodium chlorid in order at the same time to produce a cheap solution of carbonate of soda for covering all losses of sodium oxid in boiling cellulose substances. The said addition of sodium chlorid is to be effected in such manner that the quantity of sodium equivalent to the desired quantity of soda amounts to about 60 per cent. of the total percentage of sodium of the lye. On account thereof, the addition is to be calculated in the usual manner in each separate case.

In all operations performed in this process of regenerating sodium oxid from the black liquor or in simultaneously recovering sodium oxid from sodium chlorid care should be taken that the solution containing acetic acid and formic acid is not unnecessarily diluted, since in such case the price of recovering the said acids will obviously be raised.

If desired, the precipitate of bicarbonate of soda may be freed from ammonium salts by washing same with black liquors (treated with carbonic acid, or not) from which bicarbonate is to be precipitated with ammonia and carbonic acid. The precipitate of bicarbonate of soda may also be used, either directly or after imperfect washing, for producing new quantities of boiling lye. Obviously, however, the ammonia contained in the said precipitate should be recovered. If the bicarbonate of soda is to be used for producing a solution of carbonate of soda to be causticized for forming boiling lye, carbonic acid disengaged is suitably recovered in order to be again used in the process. If this carbonic acid gas contains ammonia, it may, obviously, be employed with the same result.

I claim:

1. The process of treating black liquors from soda pulp mills, which consists in first freeing the liquor to a considerable extent from organic substances capable of being precipitated by carbonic acid, and thereupon treating the said liquor with ammonia and carbonic acid at a temperature favorable for precipitating bicarbonate of soda.

2. The process of treating black liquors from soda pulp mills, which consists in first freeing the liquor to a considerable extent from organic substances capable of being precipitated by carbonic acid, treating the said liquor with ammonia and carbonic acid at a temperature favorable for precipitating bicarbonate of soda, and separating the solution from the precipitate.

ERIK LUDVIG RINMAN.

Witnesses:
 HENRY PERSON,
 WALENTIN BERGGREN.